J. BRUDERER, Jr.
PROCESS FOR MAKING RINGS.
APPLICATION FILED JAN. 28, 1916.

1,192,983.

Patented Aug. 1, 1916.

Witness
E. R. Barrett

Inventor
John Bruderer, Jr.
By Pagelsen and Spencer,
Attorney

UNITED STATES PATENT OFFICE.

JOHN BRUDERER, JR., OF DETROIT, MICHIGAN, ASSIGNOR TO THE TRAUB MANUFACTURING COMPANY, OF DETROIT, MICHIGAN, A PARTNERSHIP CONSISTING OF ROBERT C. J. TRAUB AND WILLIAM H. TRAUB.

PROCESS FOR MAKING RINGS.

1,192,983. Specification of Letters Patent. Patented Aug. 1, 1916.

Application filed January 28, 1916. Serial No. 74,757.

*To all whom it may concern:*

Be it known that I, JOHN BRUDERER, Jr., a citizen of the United States, and residing at Detroit, in the county of Wayne and State of Michigan, have invented a new and Improved Process for Making Rings, of which the following is a specification.

This invention relates to the manufacture of rings from two metals having different melting points and it consists in bringing together the ends of the metal having the higher melting point and welding or otherwise uniting these ends by fusing them while the ends of the metal having the lower melting point are spaced apart, and thereafter uniting the ends of the metal having the lower melting point.

Figure 1:
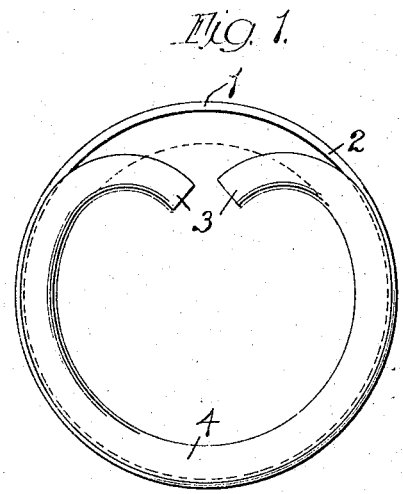
Figure 4:
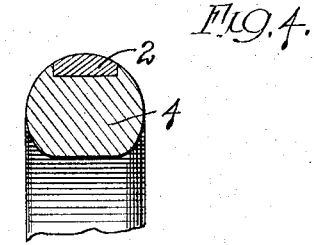
Figure 5:
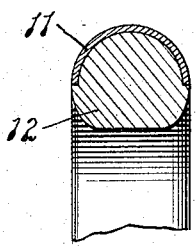
Figure 2:
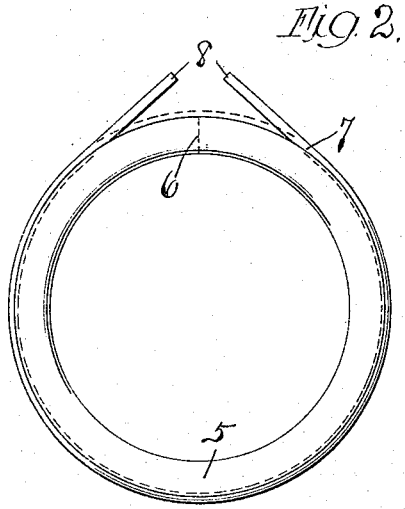
Figure 3:
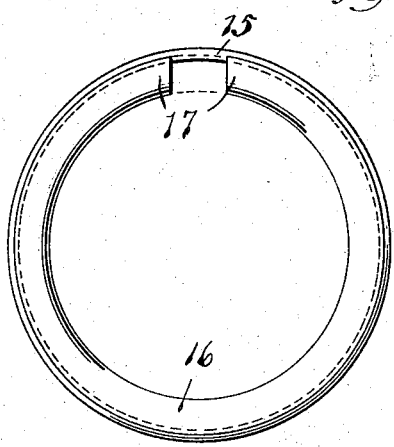

In the accompanying drawing, Figure 1 is an elevation of a ring in course of manufacture, which ring is formed of two metals, the ends of the metal of the higher melting point united and the ends of the metal of the lower melting point being bent inwardly so as to be out of the zone of high temperature. Fig. 2 is a view of a ring in course of manufacture in which the interior body of the ring is of metal having a higher melting point than the exterior band. Fig. 3 is an elevation of a ring in course of manufacture in which the bar of metal of lower melting point is made short. Figs. 4 and 5 are cross sections of rings formed of two metals.

Similar reference characters refer to like parts throughout the several views.

While this present process is peculiarly adapted to surrounding the gold bodies of finger rings with bands or shells of platinum, it is to be understood that the process may be carried out to form rings or cylinders of any two metals having different melting points. By this process integral rings of copper may be banded with silver, and copper tubes may be hooped with steel, or steel tubes hooped with copper or silver, while continuous gold rings may be circumferentially inlaid with integral and continuous strips of platinum.

Heretofore, finger rings of two metals having different melting points have been formed by soldering the two metals together to form a bar, then bending the bar to circular form, and then soldering together the ends of the bar to constitute a ring. The solder is then in evidence as it is substantially impossible to make a solder that will be invisible with two metals. The present invention produces a ring of two metals, each metal being continuous and integral instead of being discontinuous and soldered.

This process is carried out by welding or otherwise fusing the ends of the metal of higher melting point first, while the ends of the metal of lower melting point are held away from the point of contact of the ends being united, the uniting being preferably done by means of an oxy-acetylene blowpipe.

In Fig. 1 the two ends of the bar of metal of higher melting point have just been jointed at 1 to form a ring 2, the ends 3 of the grooved body 4 of the ring having previously been bent inwardly. The ends 3 will next be bent out to the position shown in dotted lines, and there joined by means of the same flame. If preferred, the two metals may be secured together by soldering both before and after the welding of their ends. The resulting ring will be of the same strength throughout, and it will be continuously integral.

If an attempt were made to weld together the ends of a band 2 of platinum adjacent to a body 4 of gold, the necessary heat of the blow-pipe would melt the gold and even burn out the alloy in the gold. It is necessary, therefore, to have the gold spaced apart from the platinum during the welding. It will of course be understood that this same process may be employed with any other metals so long as they do not alloy at the necessary lower fusing temperature.

In Fig. 2, the metal of higher melting temperature constitutes the body 5 which has been formed of a grooved bar whose ends are fused together at the dotted line 6. The band 7 is in a proper groove in the body 5, and its ends 8 are bent down to the position shown in dotted lines after the ends of the body 5 are joined, whereupon these ends 8 are fused together, thus again producing two continuous, homogeneous and integral rings of metals having different melting points.

Fig. 4 shows how the exterior band 2 may lie in a groove in the body 4, and it will be understood that the exterior band 7 will have a similar relation to the body 5. It will also be apparent that the cross-sections of the two metals may vary greatly. If the exterior member is in the form of a semi-cylindrical shell 11, as shown in Fig. 5, the body 12 will, of course, be formed to fit with this shell. The two bars or strips of metal may be of many other cross sections and have their ends united as above described.

In Fig. 3, the ends of the outer band 15 have been fused. The inner body 16 was formed shorter than the band 15 so that the ends 17 are a sufficient distance apart as not to be affected by the heat necessary to fuse the ends of the band 15. The space between these ends 17 is bridged by pouring in a melted portion of the same metal which will soften the faces of these ends sufficiently to produce a union between these ends and the freshly melted metal. Or a small block may be inserted in this space and welded into place.

If desired, the ends of the outer band of metal of higher melting point may be welded to form a continuous ring and the inner band or body of metal of lower melting point, such as shown in Figs. 1 and 3, may then be sprung in to a smaller diameter and slipped into the outer ring, being then completed as before described, the two metals being soldered together, if desired, either before or after the inner member is formed into a continuous, integral, homogeneous body in continuous engagement with the outer member. In this case as in the others, the metal of high melting point is welded while the ends of the metal of low melting point are sufficiently removed to be unaffected by the flame that causes the ends of the metal of high melting point to fuse, after which the ring of metal of low melting point is completed by fusing its ends while in direct contact with the metal of high melting point.

It is evident that the cross sections of the bands or rings of the individual metals may be varied without departing from the spirit of my invention.

I claim:—

1. The process of forming annular bodies from superimposed metal bars of different melting points which consists in bending the metal of higher melting point into a ring and fusing its ends to produce a continuous homogeneous body while the ends of the metal of lower melting point are a sufficient distance away to be unaffected, and then uniting the ends of the metal of lower melting point while in engagement with the metal of higher melting point.

2. The process of forming a ring from bars of gold and platinum which consists of bending the two bars until the ends of the platinum bar engage and then fusing said ends to unite them while out of contact with the bar of gold, and then integrally uniting the ends of the bar of gold.

In testimony whereof I sign this specification.

JOHN BRUDERER, JR.

Copies of this patent may be obtained for five cents each, by addressing the "Commissioner of Patents, Washington, D. C."